(12) United States Patent
Rajwar et al.

(10) Patent No.: US 8,301,849 B2
(45) Date of Patent: Oct. 30, 2012

(54) TRANSACTIONAL MEMORY IN OUT-OF-ORDER PROCESSORS WITH XABORT HAVING IMMEDIATE ARGUMENT

(75) Inventors: Ravi Rajwar, Portland, OR (US);
Martin G. Dixon, Portland, OR (US);
Konrad K. Lai, Vancouver, OR (US)

(73) Assignee: Intel Corporation, Santa Clara, CA (US)

( * ) Notice: Subject to any disclaimer, the term of this patent is extended or adjusted under 35 U.S.C. 154(b) by 199 days.

(21) Appl. No.: 12/646,781

(22) Filed: Dec. 23, 2009

(65) Prior Publication Data

US 2011/0153960 A1 Jun. 23, 2011

(51) Int. Cl.
*G06F 12/00* (2006.01)
(52) U.S. Cl. .................. 711/154; 711/163; 711/E12.001
(58) Field of Classification Search .................. 711/154, 711/209, E12.061, E12.078, E12.095, E12.001, 711/163; 718/1; 703/24
See application file for complete search history.

(56) References Cited

U.S. PATENT DOCUMENTS

| | | | |
|---|---|---|---|
| 6,338,137 B1* | 1/2002 | Shiell et al. | 711/167 |
| 2007/0050579 A1* | 3/2007 | Hall et al. | 711/163 |
| 2008/0270842 A1* | 10/2008 | Ho et al. | 714/42 |
| 2009/0019256 A1* | 1/2009 | Kneebone et al. | 711/209 |
| 2010/0094613 A1* | 4/2010 | Biles et al. | 711/154 |
| 2011/0004737 A1* | 1/2011 | Greenebaum | 711/163 |

* cited by examiner

*Primary Examiner* — Pierre-Michel Bataille
(74) *Attorney, Agent, or Firm* — Blakely, Sokoloff, Taylor & Zafman LLP (57) ABSTRACT

Methods, systems, and apparatuses to provide an XABORT in a transactional memory access system are described. In one embodiment, the stored value is a context value indicating the context in which a transactional memory execution was aborted. A fallback handler may use the context value to perform a series of operations particular to the context in which the abort occurred.

20 Claims, 8 Drawing Sheets

600 XABORT instruction with and without arguments

601 XABORT

602 XABORT <ia>

603 XABORT <ia1>, <ia2>

604 XABORT <ia1>, <ia2>, . . ., <iaN>

TRANSACTIONAL MEMORY IN OUT-OF-ORDER PROCESSORS WITH XABORT HAVING IMMEDIATE ARGUMENT

FIELD OF THE INVENTION

The present disclosure generally relates to the field of electronics. More particularly, an embodiment of the invention relates to transactional memory (TM) execution in out-of-order processors.

BACKGROUND

To improve performance, some computer systems execute multiple threads concurrently. Generally, before a thread accesses a shared resource, it acquires a lock of the shared resource. In situations where the shared resource is a data structure stored in memory, all threads that are attempting to access the same resource may serialize the execution of their operations in light of mutually exclusivity provided by the locking mechanism. This may be detrimental to system performance and may cause program failures, e.g., due to deadlock bugs.

To reduce performance loss resulting from utilization of locking mechanisms, some computer systems may use transactional memory. Transactional memory generally refers to a synchronization model that allows multiple threads to concurrently access a shared resource without utilizing a locking mechanism.

BRIEF DESCRIPTION OF THE DRAWINGS

The detailed description is provided with reference to the accompanying figures. In the figures, the left-most digit(s) of a reference number identifies the figure in which the reference number first appears. The use of the same reference number in different figures indicates similar or identical items.

DETAILED DESCRIPTION

In the following description, numerous specific details are set forth in order to provide a thorough understanding of various embodiments. However, some embodiments may be practiced without specific details. In other instances, well-known methods, procedures, components, and circuits have not been described in detail so as not to obscure the particular embodiments.

Figure 1:
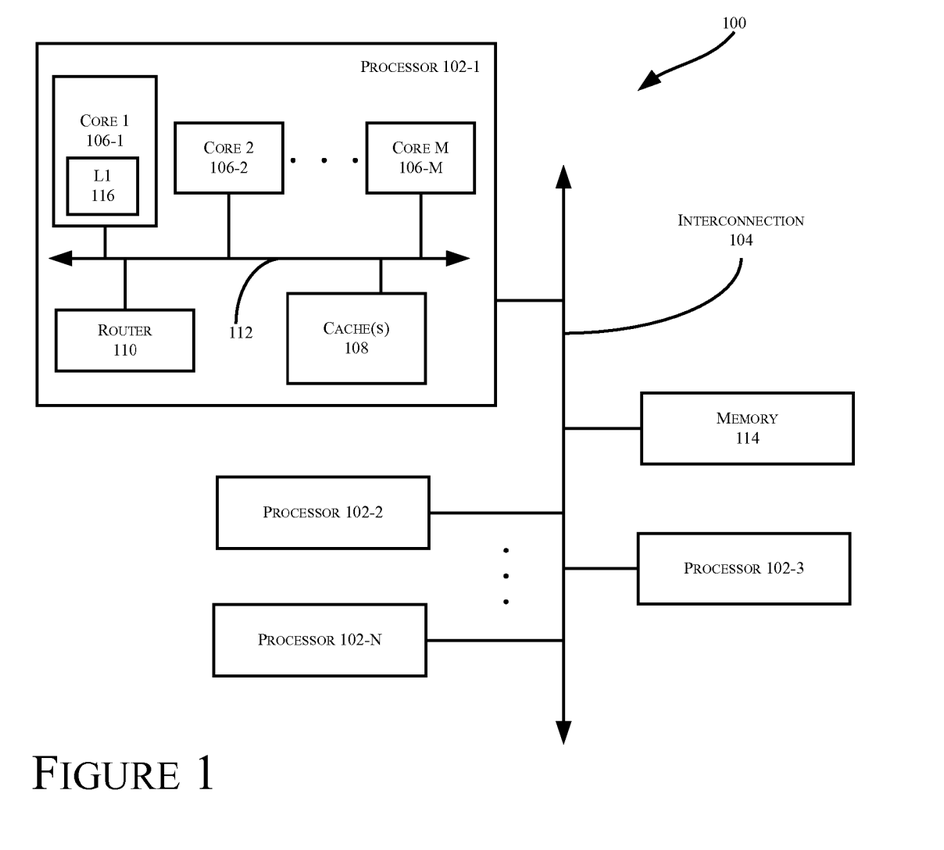
FIG. 1 illustrates a block diagram of a computing system according to an embodiment of the invention.

Some embodiments discussed herein provide mechanisms for providing an XABORT instruction with an immediate argument in a transactional memory system. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 includes one or more processor cores 106-1 through 106-M (referred to herein as "cores 106," or more generally as "core 106"), a cache 108 (which may include one or more private or shared caches), and/or a router 110. The processor cores 106 may be implemented on a single integrated (IC) chip. Moreover, the processor may include buses or interconnections (such as a bus or interconnection 112), memory controllers, or other components which are not illustrated.

In one embodiment, the router 110 is used to communicate between various components of the processor 102-1 and/or system 100. Moreover, the processor 102-1 may include more than one router 110. Furthermore, the multitude of routers (110) may be in communication to enable data routing between various components inside or outside of the processor 102-1.

The cache 108 stores data (e.g., including instructions) that is utilized by one or more components of the processor 102-1, such as the cores 106. For example, the cache 108 may locally cache data stored in a memory 114 for faster access by the components of the processor 102. As shown in FIG. 1, the memory 114 communicates with the processors 102 via the interconnection 104. In an embodiment, the cache 108 is a last level cache (LLC). Also, each of the cores 106 may include a level 1 (L1) cache (116) (generally referred to herein as "L1 cache 116"). Furthermore, the processor 102-1 may also include a mid-level cache (L2) that is shared by several cores (106). Various components of the processor 102-1 may communicate with the cache 108 directly, through a bus (e.g., the bus 112), and/or a memory controller or hub.

Figure 2:
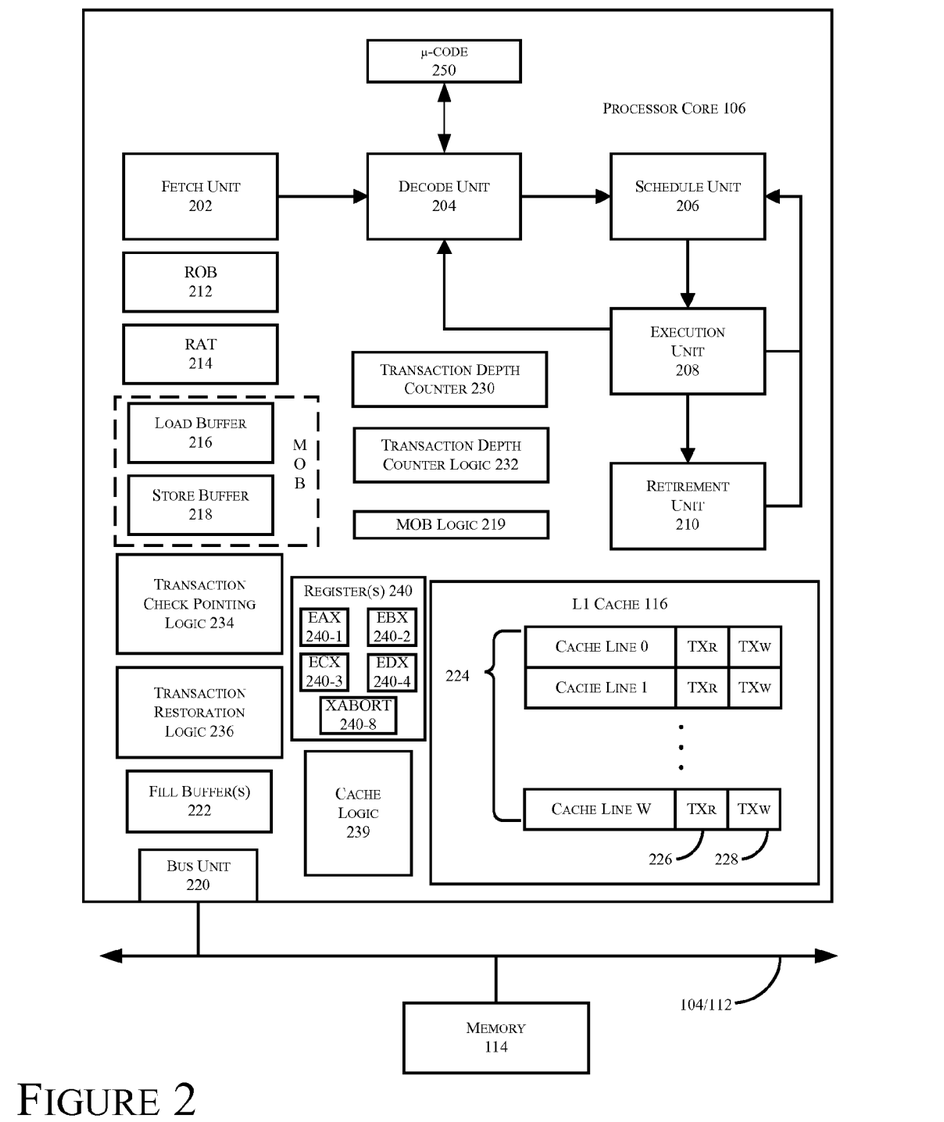
FIG. 2 illustrates a block diagram of portions of a processor core, according to an embodiment of the invention.

FIG. 2 illustrates a block diagram of portions of a processor core 106 according to an embodiment of the invention. In one embodiment, the arrows shown in FIG. 2 illustrate the flow of instructions through the core 106. In some embodiments, the core 106 executes the XABORT instruction.

As illustrated in FIG. 2, the processor core 106 may include a fetch unit 202 to fetch instructions for execution by the core 106. The instructions may be fetched from any storage device such as the memory 114. The core 106 may also include a decode unit 204 to decode the fetched instruction. For instance, in some embodiments the decode unit 204 decode a fetched instruction into a plurality of μops (micro-operations) using microcode 250. The decode unit 204 decodes the below described XABORT instruction 602 with an immediate argument.

Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 schedules and/or issue (or dispatch) decoded instructions to an execution unit 208 for execution. The execution unit 208 executes decoded instructions. In an embodiment, the execution unit 208 may include one or more functional units such as at least one execution unit, at least one memory execution unit, at least one integer execution unit, at least one floating-point execution unit, or other execution units. Further, the execution unit 208 may execute instructions out-of-order. Hence, the processor core 106 may be an out-of-order processor core in some embodiments. The core 106 may also include a retirement unit 210. The retirement unit 210 retires executed instructions after they are committed. In an embodiment, retirement of the executed instructions results in processor state being committed from the execution of the instructions, physical registers used by the instructions being de-allocated, etc.

Furthermore, the core 106 includes one or more registers 240 including an XABORT status register 240-8 as discussed later with respect to FIG. 3 It should be noted that FIG. 2 only illustrates a single XABORT status register 240-8 for clarity; however, the register block 240 could include two or more XABORT status registers 240-8 as well. In at least one embodiment, the XABORT status register 240-8 is a specially purposed register in registers 240, although in other embodiments the XABORT status register 240-8 corresponds to one or more of the general purpose registers, such as EAX, EBX, ECX, or EDX 240-1 to 204-4. Additionally, the XABORT status register 240-8 may be implemented as any type of storage device such as a variable stored in memory (e.g., the memory 114 or cache 116).

As shown in FIG. 2, the core 106 may include a reorder buffer (ROB) 212 to store information about in flight instructions (or µops) for access by various components of the processor core 106. The core 106 may further include a RAT (register alias table) 214 to maintain a mapping of logical (or architectural) registers (such as those identified by operands of software instructions) to corresponding physical registers. In one embodiment, each entry in the RAT 214 includes an ROB identifier assigned to each physical register. Additionally, a load buffer 216 and a store buffer 218 (which may be referred to collectively herein as memory order buffer (MOB)) may store pending memory operations that have not loaded or written back to a main memory (e.g., a memory that is external to the processor core 106, such as memory 114), respectively. An MOB logic 219 performs various operations relating to the buffers 216 and 218 such as discussed herein, for example, with reference to FIG. 5.

Furthermore, the processor core 106 may include a bus unit 220 to allow communication between components of the processor core 106 and other components (such as the components discussed with reference to FIG. 1) via one or more buses (e.g., buses 104 and/or 112). One or more fill buffers 222 may temporary store data that is received (e.g., over the buses 104 and/or 112) from the memory 114 prior to storing the received data into the cache 116.

As shown in FIG. 2, the cache 116 may include one or more cache lines 224 (e.g., cache lines 0 through W). In an embodiment, each line of the cache 116 includes a transaction read bit 226 and/or a transaction write bit 228 for each thread executing on the core 106. Bits 226 and 228 may be set or cleared as discussed with reference to FIG. 5, e.g., to indicate (load and/or store) access to the corresponding cache line by a transactional memory access request. Also, even though in FIG. 2, each cache line 224 is shown as having a respective bit 226 and 228, other configurations are possible. For example, a transaction read bit 226 (or transaction write bit 228) may correspond to a select portion of the cache 116, such as a cache block or other portion of the cache 116. Also, the bits 226 and/or 228 may be stored in locations other than the cache 116, such as in the cache 108 of FIG. 1, the memory 114, or a victim cache, for example.

As will be further discussed with reference to FIG. 5, the core 106 may include a transaction depth counter 230 to store a value corresponding to the number of transactional memory access requests that remain uncommitted. For example, the value stored in the counter 230 may indicate the nesting depth of multiple transactional memory access requests that correspond to the same thread. In one instance, multiple transactional memory access requests may result when one transaction is initiated inside a pending transaction (such as via a library call or other nested procedure). The counter 230 may be implemented as any type of a storage device such as a hardware register or a variable stored in a memory (e.g., the memory 114 or cache 116). The core 106 may also include a transaction depth counter logic 232 to update the value stored in the counter 230. Additionally, as will be further discussed with reference to FIG. 5, the core 106 may include a transaction check pointing logic 234 to check point (or store) the state of various components of the core 106 and a transaction restoration logic 236 to restore the state of various components of the core 106. The core 106 may also include a cache logic 239 which may perform various operations by accessing the cache 116. Additionally, the core 106 may include one or more additional registers 240 that correspond to various transactional memory access requests, such as transaction status and control (TXSR), transaction instruction pointer (TXIP) (e.g., that may be an instruction pointer to an instruction at the beginning (or immediately preceding) the corresponding transaction), and/or transaction stack pointer (TXSP) (e.g., that may be an stack pointer to the head of a stack that stores various states of one or more components of the core 106). The processing of operations corresponding to one or more transactional memory access requests is also referred to as transactional memory execution. Any of the above logic and units may be hardware circuitry, software, or a combination thereof.

Figure 3:
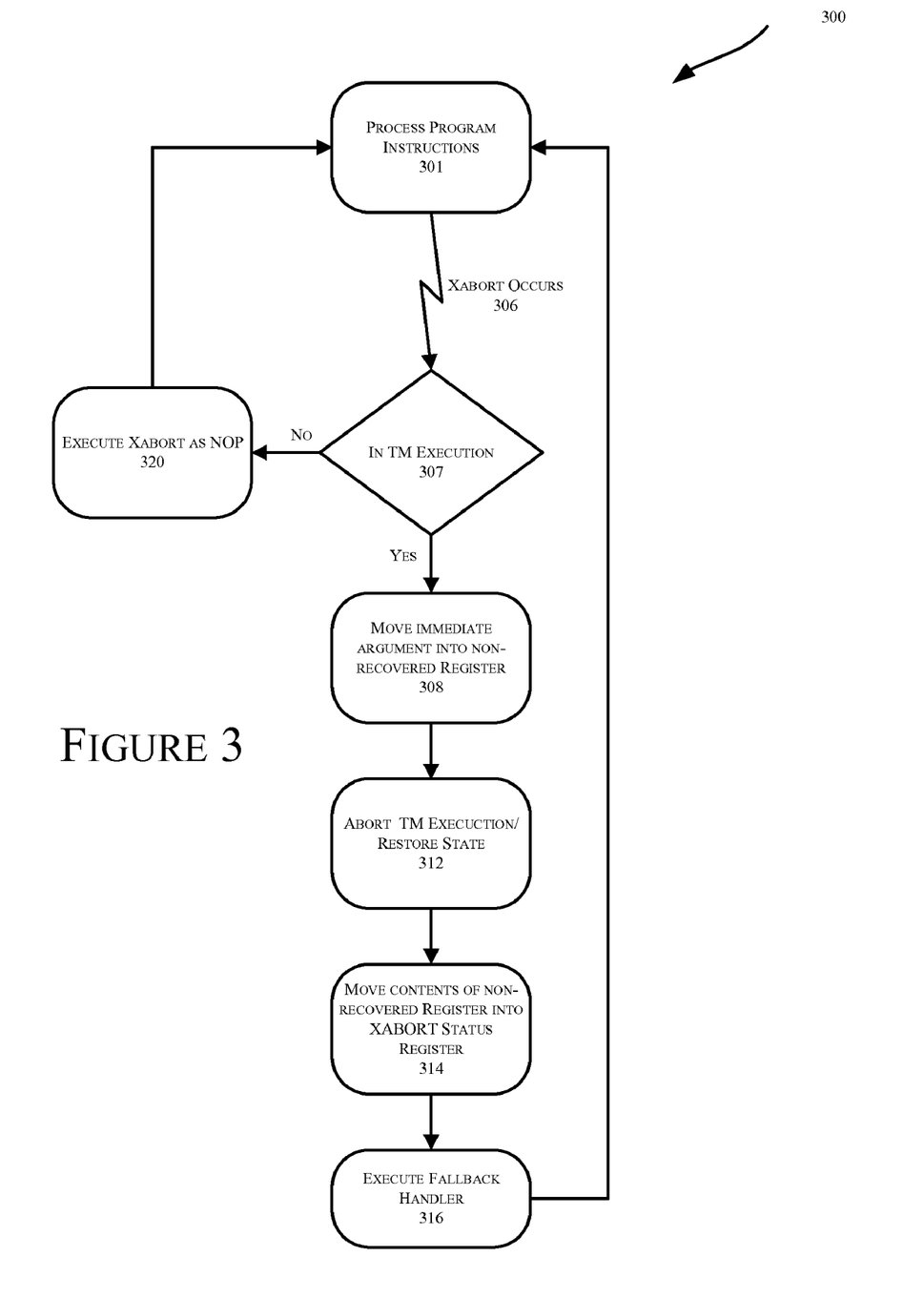
FIG. 3 illustrates a block diagram of an embodiment of a method to process an XABORT instruction.
Figure 4:
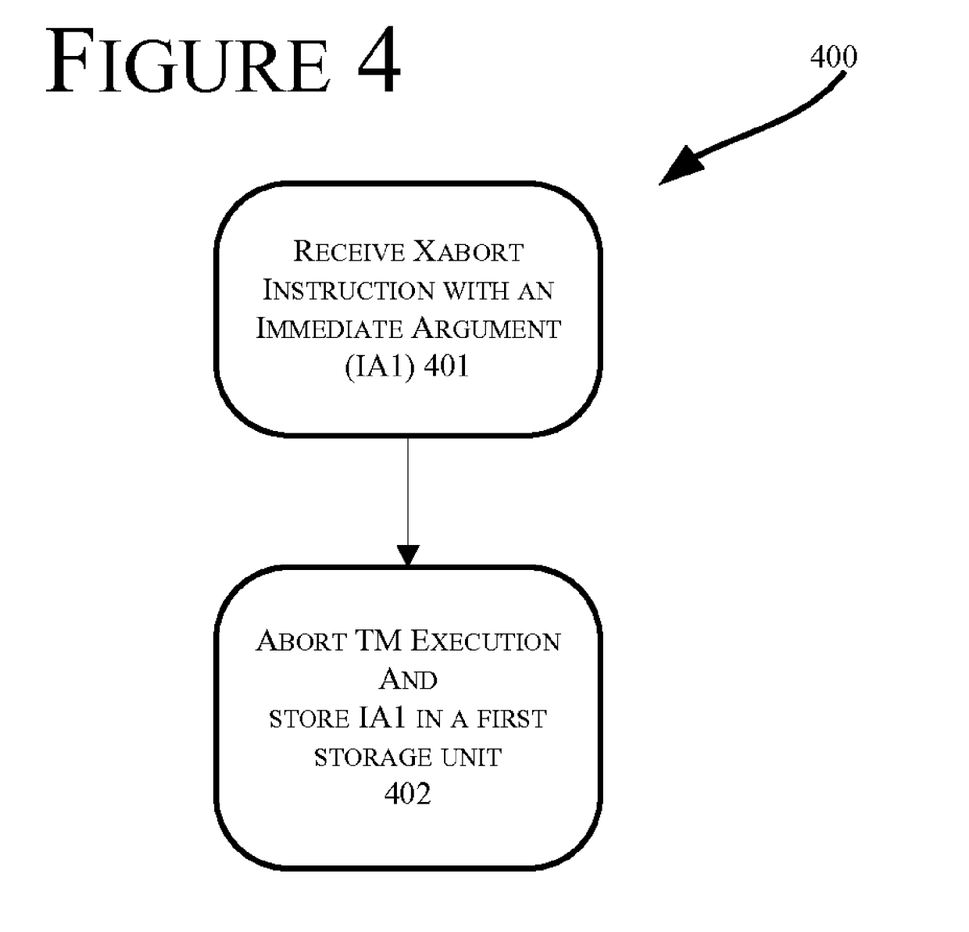
FIG. 4 illustrates a block diagram of an embodiment of a method to process an XABORT instruction.

FIG. 3 illustrates a block diagram of an embodiment of a method 300 to process an XABORT (explicit abort) instruction. The core processes program instructions at 301. During this processing, XABORT instruction is encountered at 306. The XABORT instruction allows a user to explicitly abort transactional memory execution. The XABORT instruction may occur in the form of an interrupt, either a hardware interrupt or a software interrupt.

Figure 6:
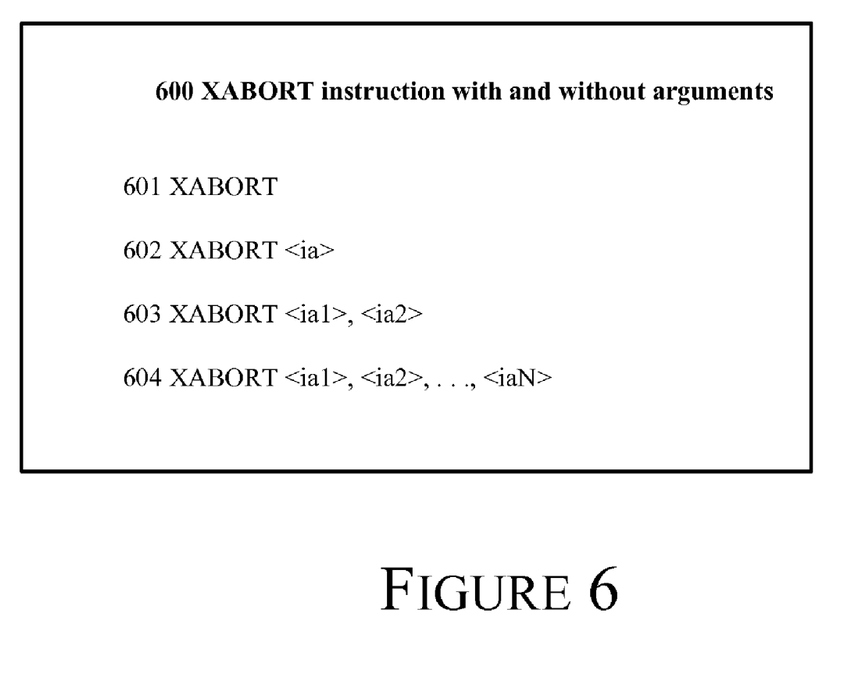
FIG. 6 illustrates embodiments of the XABORT instruction with and without immediate arguments.

FIG. 6 shows various embodiments of the XABORT instruction. XABORT instruction 601 is an embodiment of the instruction in which the instruction does not include an immediate argument. In this embodiment, the immediate is loaded into a register prior to the decoding and execution of the XABORT instruction.

XABORT instruction 602 is an embodiment of the instruction in which the instruction includes one immediate argument. The immediate argument corresponds to an enumeration of value having a specific meaning corresponding to a preset of error conditions. Specifically, the immediate argument may be set to one of many enumerated values corresponding to a number of error conditions in which the XABORT instruction may occur. Embodiments of the XABORT instruction 603 and 604 each take two or more immediate arguments respectively.

The sizes of the intermediate arguments for any of the above XABORT instructions are a design decision and, thus, the immediate arguments may be of any size, but are commonly 8, 16, 32, 64, or 128 bits. Each XABORT instruction consists of an opcode and potentially one or more immediates (depending upon the embodiment).

A determination of whether transactional memory execution is being processed when the XABORT 600 occurs is made at 307. If a transactional memory access is not being processed, a No-Operation ("NOP") instruction 320 is executed in the place of executing the XABORT instruction. If the XABORT instruction occurred during a transactional memory access, then the transactional memory access is aborted in the manner described in detail below.

In one embodiment, the immediate argument (or arguments) is into one or more of the non-recovered registers 240 at operation 308. A non-recovered register is any register that is not restored to a previous state. In embodiments where no immediate argument is passed with the XABORT instruction, one or more of the non-recovered registers 240 is set to a predetermined value. In one embodiment, the transactional memory execution is aborted and the transaction restoration logic 236 restores various components of the core 106 to a previous state as discussed below with reference to 512 of FIG. 5.

Figure 5:
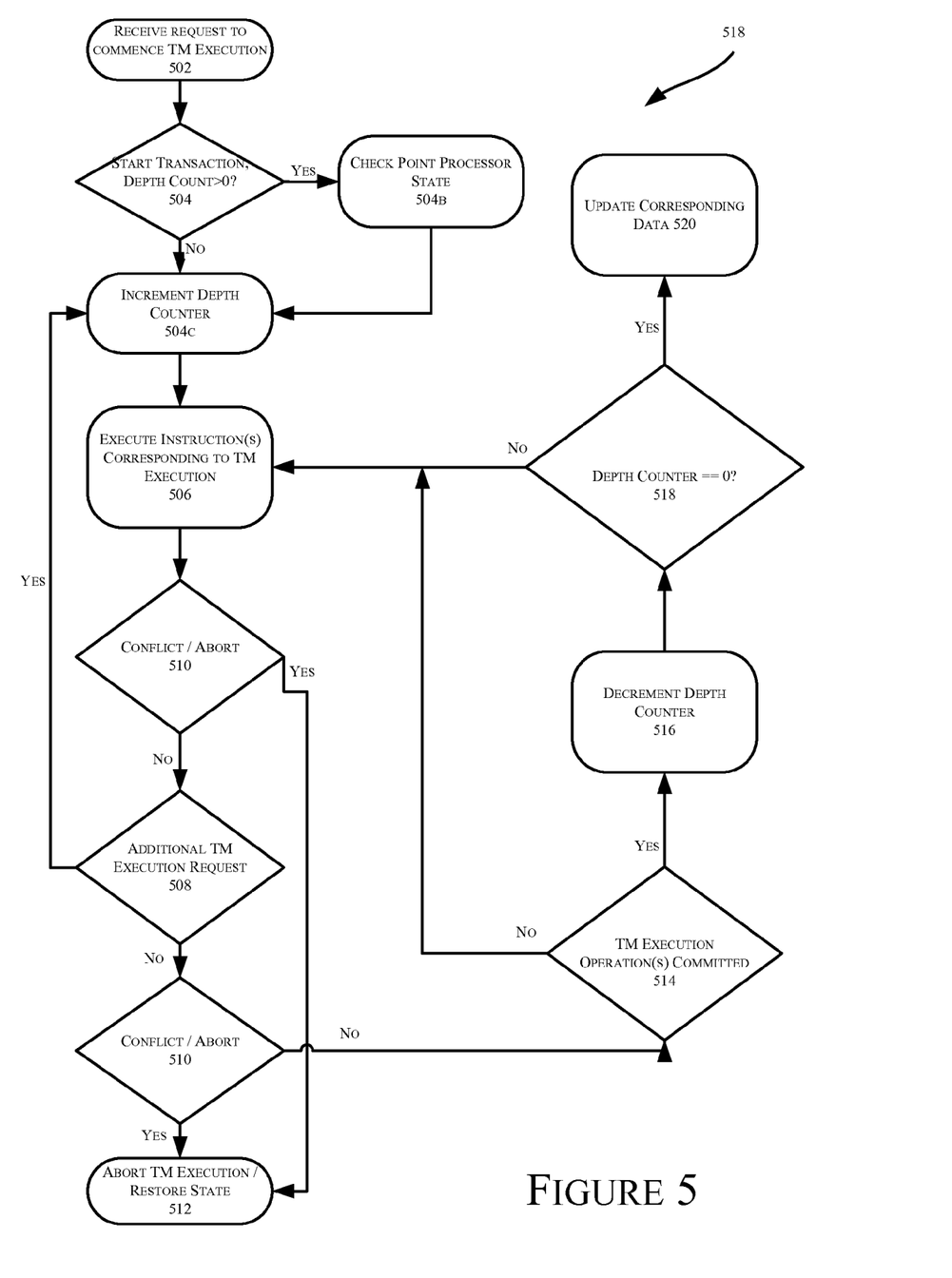
FIG. 5 illustrates a block diagram of an embodiment of a method to execute one or more operations corresponding to a transactional memory access execution.

More specifically, FIG. 5 illustrates a block diagram of an embodiment of a method 500 to execute one or more operations corresponding to transactional memory execution. In an embodiment, various components discussed with reference to FIGS. 1-2 may be utilized to perform one or more of the operations discussed with reference to FIG. 5.

Referring to FIGS. 1-2, and 5, at an operation 502, a request to commence transactional memory execution (such as one or more memory load or store operations) is received. For example, the fetch unit 202 may fetch an instruction that indicates the start of a transactional memory execution. In accordance with at least one instruction set architecture, the instruction indicating the start of a transactional memory execution may be TXMBEG<user_handler_IP>, where user_handler_IP identifies a user handler procedure, also known as a fallback handler, to which execution may be redirected in case of an abort, error, or other fault conditions. In some cases, it may be useful to provide the fallback handler with the context in which an abort occurred. Also, a transactional end instruction (such as TXMEND in accordance with at least one instruction set architecture) may indicate the end of a transaction. In one embodiment, all operations between the TXMBEG instruction and TXMEND may be marked as transactional. In an embodiment, the transactional operations may default to be transactional (and explicitly non-transactional, for example, through an instruction prefix or parameter), e.g., allowing non-transactional legacy libraries to be used transactionally without code changes. Alternatively, the transactional operations may default to be non-transactional (and explicitly transactional, for example, through an instruction prefix or parameter). In an embodiment, special set of explicit non-transactional instructions may be utilized that are treated non-transactionally even though they may appear within a transaction, e.g., between a TXMBEG instruction and a TXMEND instruction. Also, in an embodiment, non-transactional store operations occurring within a transaction (e.g., between a TXMBEG instruction and a TXMEND instruction) may be executed by the execution unit 208 as write-through operations to the memory 114. In one embodiment, the setting for the default treatment of the operations may be provided with the TXMBEG instruction, e.g., provided through a corresponding parameter or prefix. In an embodiment, the setting for the default may be provided through a mode bit in a control register.

At an operation 504c, the logic 232 may update the counter 230 (e.g., may increment or decrement the counter 230, depending on the implementation). In one embodiment, the execution of the TXMBEG instruction (e.g., by the execution unit 208) may result in updating of the counter 230. Alternatively, the counter 230 may be updated at issue time, e.g., when the schedule unit 206 issues the TXMBEG instruction. Also, at operation 504B, the transaction check pointing logic 234 may check point the state of various components (e.g., counter 230 and/or registers 240). For example, the logic 234 may store the state of one or more components of the core 106 in a storage device (e.g., in the cache 116, cache 108, and/or memory 114). As will be further discussed herein, since the core 106 may process more than one transactional memory access request at the same time (and/or speculatively), the logic 234 may store more than one state of various components of the core 106, and in one embodiment the various check pointed states may be stored to a data structure that is implemented as a stack. In an embodiment, the logic 234 may store a check-pointed state corresponding to the outermost transactional memory request.

At an operation 506, one or more instructions (or operations) corresponding to the transactional memory execution of the operation 502 may be executed, e.g., by the execution unit 208. During execution of instructions at operation 506, each time a portion of the cache 116 is accessed, the corresponding bit (e.g., bits 226 and/or 228 may be updated, for example, set or cleared depending on the implementation). For example, cache logic 239 may identify transactional instructions that are accessing the cache 116 and update the corresponding bits 226 and/or 228. In one embodiment, the instructions of operation 506 may be identified explicitly or implicitly as being a transactional or non-transactional operation, for example, by using a prefix (or control bit) that may be provided with the instruction and/or stored in a corresponding location, such as within a corresponding entry of the ROB 212.

At an operation 510, it is determined whether a conflict or abort condition corresponding to execution of the instructions of the operation 506 exists. If there is a conflict with another instruction (which may be an instruction corresponding to another thread, e.g., executing on the same or a difference processor core), the transaction is aborted at an operation 512. For example, a conflicting instruction may send a snoop invalidate for an entry in the cache 116 that the transaction of operation 502 is accessing (or has marked as being accessed, as indicated by a value stored in bits 226 and/or 228). Moreover, if the transaction write bit 228 of the portion of the cache 116 indicates a previous write access to the same portion of the cache, a snoop read request from another thread to the same portion of the cache 116 may be aborted at operation 512. Also, the abort at operation 510 may be due to an implementation-specific event that forces an abort (e.g., an uncacheable (UC) event, an I/O event, a buffer overflow, etc.)

At an operation 508, if another request to commence transactional memory execution is received, the method 500 continues with the operation 504c. Otherwise, if no additional requests to commence transactional memory execution are received at operation 508, also another conflict/abort check 510 is performed after operation 508 and handled in the previously described manner.

In an embodiment, if a snoop results in invalidation of data stored in memory (such as stored in the cache 116), the load instruction at the head of the load buffer 216 may be included in the snoop check and a full address check may be performed (instead of a partial address check), e.g., by the MOB logic 219. If the load instruction at the head of the load buffer 216 conflicts with the snoop at operation 510, the corresponding transactional memory request may be aborted at operation 512. Alternatively, an explicit abort request may cause performance of operation 510. For example, in accordance with at least one instruction set architecture, the instruction indicating the abort of a transactional memory execution may be TXMABT. The abort instruction may result in explicit abort which, in case of multiple nested transactional memory access requests (e.g., as indicated by the value stored in the counter 230), may result in roll-back to a prior state and calling the corresponding handler (e.g., innermost handler in case of multiple pending transactional memory access requests that may be identified with the corresponding TXM-BEG instruction such as discussed with reference to operation 502). In one embodiment, the abort may result in roll-back to the check pointed state corresponding to the outermost transaction and calling the corresponding outermost TXMBEG handler. In one embodiment, at operation 512, the transaction restoration logic 236 may restore various components of the core 106 to a previous state such as discussed with reference to FIG. 2.

In an embodiment, the check pointing at operation 504B may be performed by using a copy-on-write mechanism to record register recovery state in a bit present in registers 240 and/or a corresponding entry of the RAT 214. For example, a 1-bit array may be associated with each RAT instantiation (alternatively only one such array may be used). While the value stored in the counter 230 indicates a pending transaction (e.g., TXND>0 in one embodiment), then while the decode unit 204 is performing a register rename operation, the array is checked. If the corresponding bit indicates no previous access, then a μop is inserted into the instruction flow and the ROB 212 to write the corresponding data into one of the registers 240, e.g., prior to the rename. If the corresponding bit indicates a previous access, no copying is necessary since the corresponding data has already been copied prior to a write. If a branch misprediction occurs, the various 1-bit arrays may be logically OR-ed together, e.g., to form the starting array going forward. If this is done, then repeated mispredictions may not result in repeated copy-on-write operations since one copy of a given data is guaranteed to exist in a register of the core 106. This may limit the performance overhead of copy-on-write.

In one embodiment, when the cache 116 is evicted, the entries that have an active (e.g., set) bit 226 or bit 228 may be evicted last. If no further available space remains in the cache 116, the program execution may be redirected to a user handler (such as the handler of the corresponding TXMBEG instruction). Additionally, the fill buffers 222 may be used to service non-transactional operation(s) (e.g., store data) while a transaction is active but temporarily suspended.

If no conflicts exist, at an operation 514, it is determined whether the transactional memory execution operation(s) corresponding to a transactional memory execution request (e.g., as identified by a TXMBEG and a corresponding TXMEND instruction) are successfully committed (e.g., by the retirement unit 210). If the transactional memory execution operation(s) remain uncommitted, the method 500 continues with the operation 506 to execute the corresponding instruction(s). Once the transactional memory execution operation(s) corresponding to a transactional memory execution request are successfully committed, the logic 232 updates the counter 230 at an operation 516. In one embodiment, execution (e.g., by the execution unit 208) or issuance (e.g., by the schedule unit 206) of the TXMEND instruction may result in commitment of transactional memory execution, and hence performance of operation 516.

At an operation 518, it is determined whether any transactional memory execution operation(s) corresponding to other transactional memory execution requests remain uncommitted. In one embodiment, operation 518 may be performed by logic 232, for example, by determining whether the value stored in the counter 230 indicates existence of remaining transactional memory access requests (e.g., when the counter 230 is not clear in an embodiment). If other operation(s) remain to be executed at operation 518, the method 500 continues with the operation 506. Once no further operations corresponding to transactional memory execution remain (e.g., the counter 230 is clear), at an operation 520, the corresponding data (e.g., within the cache 116, cache 108, and/or memory 114) are updated atomically in accordance with operations of the committed transactional memory access request(s). Also, the TXMEND instruction may indicate a commit point for the corresponding transactional memory access request if the value stored in the counter 230 indicates that the TXMEND corresponds to the outermost transactional memory access (e.g., when the counter 230 is clear). In one embodiment, the corresponding bits 226 and/or 228 may also be updated (e.g., cleared in an embodiment) to indicate that no further transactional memory access requests are pending in the core 106. Accordingly, the TXMEND instruction may result in an atomic commit, e.g., by ensuring that all speculation and/or exceptions have been resolved, all cache blocks that belong to the transaction write set are in exclusive state, and/or all blocks that belong to the read set are currently present and valid. Read or write sets as discussed herein may generally refer to sets of data within memory (e.g., cache 116) that correspond to bits 226 and 228, respectively. In an embodiment, the incoming snoops are stalled while the corresponding write set is being committed.

Referring back to FIG. 3 at 314 the contents of the previously set non-recovered register are moved to at least a portion of the XABORT status register 240-8 in register block 240. In one embodiment, this allows the immediate argument passed with the XABORT instruction to provide the context in which the transactional memory access was aborted. In other embodiments, this allow for the predetermined value set to provide the context in which the transactional memory execution was aborted. Program execution is be redirected to a user fallback handler (such as the handler described in reference to the TXMBEG instruction from FIG. 5) and the context value is used in the handler to process specific error conditions. The user handler may utilize the context value to respond to the XABORT instruction in a manner appropriate for the particular context of the XABORT instruction. For example, the XABORT instruction 602 may be executed with a context value indicating that all nested requests to commence transactional memory execution are being unwound. In this example, the user handler may have code designed to check for this condition and perform a serious of operations in response to the unwinding of nested transactional memory execution requests. Additionally, the context value may be displayed on a computer monitor, output to a printing device, etc.

It should be appreciated that at least one embodiment includes moving the one or more immediate arguments into one or more non-recovered registers 240 prior to moving the contents into one or more XABORT status registers 240-8. However, the separate steps are not be required by some embodiments in which the one or more immediate arguments or predetermined values are moved directly into one or more XABORT status registers 240-8.

It should, further, be appreciated that although the phrase "moved" has been used to describe the storage of the one or more immediate arguments into the XABORT status register 240-8, this phrase should be viewed as non-limiting. "Moved" merely describes the process of storing the source value (e.g. immediate argument) into a destination location (e.g. non-recovered register 240). This operation could also be referred to as a copy or store operation. Further, any operation or circuitry that stores a source value into a destination location may be used for this purpose.

FIG. 6 shows various embodiments of the XABORT instruction. XABORT instruction 501 is an embodiment of the instruction in which the instruction does not include an immediate argument. XABORT instruction 602 is an embodiment of the instruction in which the instruction includes one intermediate argument. Embodiments of the XABORT instruction 603 and 604 each take two or more intermediate arguments. The sizes of the intermediate arguments are a design decision and, thus, the intermediate arguments may be of any size, commonly 8, 16, 32, 64, or 128 bits.

Figure 7:
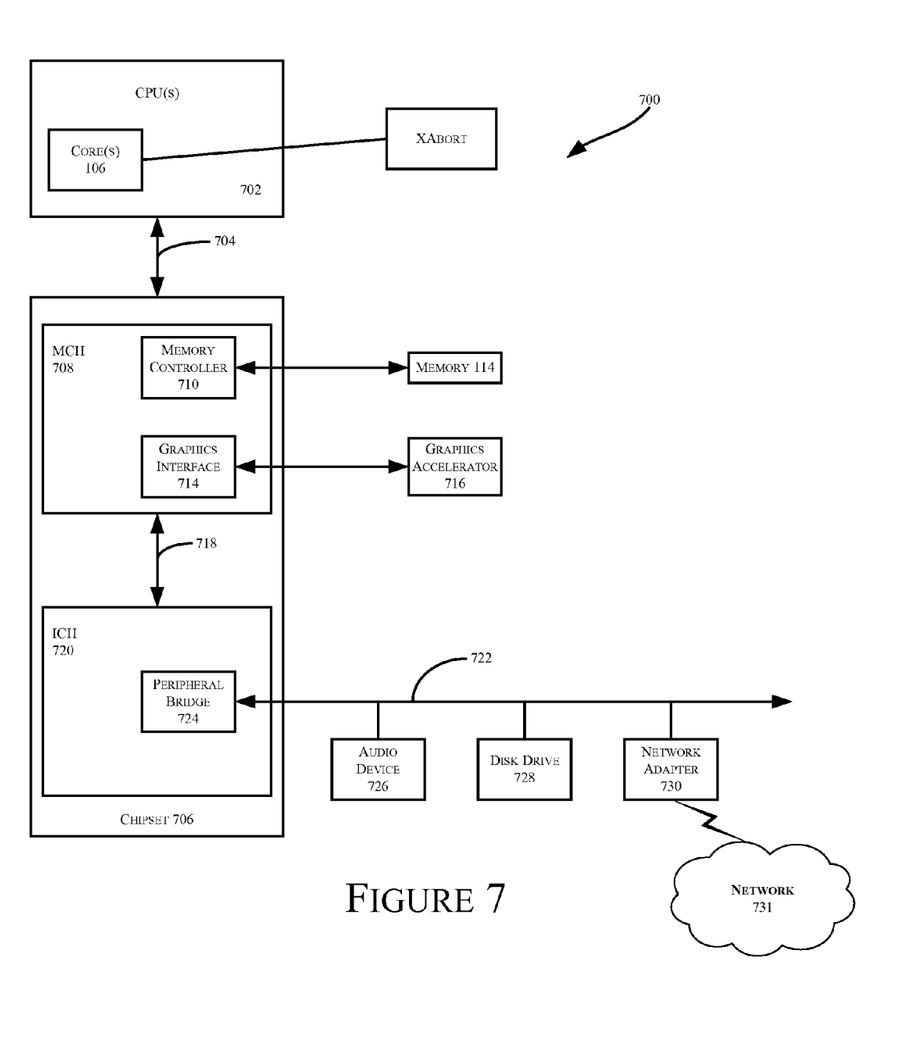
FIG. 7 illustrates a block diagram a computing system according to an embodiment of the invention.

FIG. 7 illustrates a block diagram of an embodiment of a computing system 700. The computing system 700 may include one or more central processing unit(s) (CPUs) or processors 702 that communicate with an interconnection (or bus) 704. In an embodiment, the processors 702 may be the same as or similar to the processors 102 of FIG. 1. Also, the interconnection 704 may be the same as or similar to the interconnections 104 and/or 112 discussed with reference to FIGS. 1-2. The processors 702 may include any type of a processor such as a general purpose processor, a network processor (e.g., a processor that processes data communicated over a computer network), or another processor, including a reduced instruction set computer (RISC) processor or a complex instruction set computer (CISC) processor. Moreover, the processors 702 may have a single or multiple core design, e.g., including one or more processor cores (106) such as discussed with reference to FIGS. 1-2. The processors 702 with a multiple core design may integrate different types of processor cores on the same integrated circuit (IC) die. Also, the processors 702 with a multiple core design may be implemented as symmetrical or asymmetrical multiprocessors.

As shown in FIG. 7, a chipset 706 may communicate with the interconnection 704. The chipset 706 may include a memory control hub (MCH) 708. The MCH 708 may include a memory controller 710 that communicates with the memory 114. The memory 114 may store data, e.g., including sequences of instructions that are executed by the processors 702, or any other device in communication with the computing system 700. In one embodiment of the invention, the memory 114 may include one or more volatile storage (or memory) devices such as random access memory (RAM), dynamic RAM (DRAM), synchronous DRAM (SDRAM), static RAM (SRAM), or other volatile memory devices. Nonvolatile memory may also be used such as a hard disk. Additional devices may communicate via the interconnection 704, such as multiple processors and/or multiple system memories.

The MCH 708 may additionally include a graphics interface 714 in communication with a graphics accelerator 716. In one embodiment, the graphics interface 714 may communicate with the graphics accelerator 716 via an accelerated graphics port (AGP). In an embodiment of the invention, a display (such as a flat panel display) may communicate with the graphics interface 714 through, for example, a signal converter that translates a digital representation of an image stored in a storage device such as video memory or system memory into display signals that are interpreted and displayed by the display. In various embodiments, the display signals produced by the display device may pass through various control devices before being interpreted by and subsequently displayed on the display.

Furthermore, a hub interface 718 may enable communication between the MCH 708 and an input/output (I/O) control hub (ICH) 720. The ICH 720 may provide an interface to I/O devices in communication with the computing system 700. The ICH 720 may communicate with a bus 722 through a peripheral bridge (or controller) 724, such as a peripheral component interconnect (PCI) bridge or a universal serial bus (USB) controller. The bridge 724 may provide a data path between the processor 702 and peripheral devices. Other types of topologies may be utilized. Also, multiple buses may communicate with the ICH 720, e.g., through multiple bridges or controllers. Moreover, other peripherals in communication with the ICH 720 may include, in various embodiments of the invention, integrated drive electronics (IDE) or small computer system interface (SCSI) hard drive(s), USB port(s), a keyboard, a mouse, parallel port(s), serial port(s), floppy disk drive(s), or digital data support interfaces (e.g., digital video interface (DVI)).

The bus 722 may communicate with an audio device 726, one or more disk drive(s) 728, and a network adapter 730. The network adapter 730 may communicate with a computer network 731, e.g., enabling various components of the system 700 to send and/or receive data over the network 731. Other devices may communicate through the bus 722. Also, various components (such as the network adapter 730) may communicate with the MCH 708 in some embodiments of the invention. In addition, the processor 702 and the MCH 708 may be combined to form a single chip. Furthermore, the graphics accelerator 716 may be included within the MCH 708 in other embodiments of the invention.

In an embodiment, the computing system 700 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 728), a floppy disk, a compact disk ROM (CD-ROM), a digital versatile disk (DVD), flash memory, a magneto-optical disk, or other types of nonvolatile machine-readable media for storing electronic data (e.g., including instructions).

Figure 8:
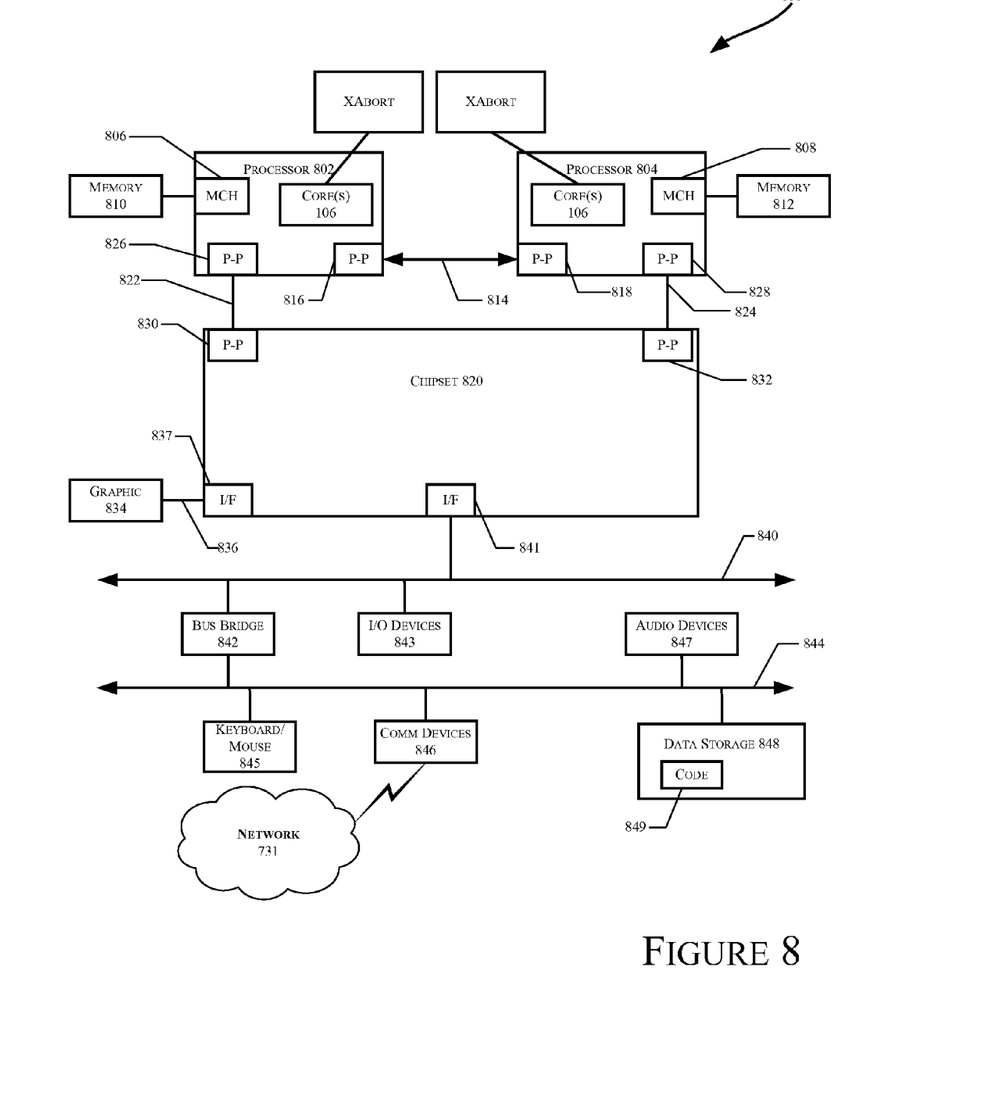
FIG. 8 illustrates a block diagram a computing system according to an embodiment of the invention.

FIG. 8 illustrates a computing system 800 that is arranged in a point-to-point (PtP) configuration, according to an embodiment of the invention. In particular, FIG. 8 shows a system where processors, memory, and input/output devices are interconnected by a number of point-to-point interfaces. The operations discussed with reference to FIGS. 1-6 may be performed by one or more components of the system 800.

As illustrated in FIG. 8, the system 800 may include several processors, of which only two, processors 802 and 804 are shown for clarity. The processors 802 and 804 may each include a local memory controller hub (MCH) 806 and 808 to enable communication with memories 810 and 812. The memories 810 and/or 812 may store various data such as those discussed with reference to the memory 114 of FIGS. 1, 2, and 7.

In an embodiment, the processors 802 and 804 may be one of the processors 702 discussed with reference to FIG. 7. The processors 802 and 804 may exchange data via a point-to-point (PtP) interface 814 using PtP interface circuits 816 and 818, respectively. Also, the processors 802 and 804 may each exchange data with a chipset 820 via individual PtP interfaces 822 and 824 using point-to-point interface circuits 826, 828, 830, and 832. The chipset 820 may further exchange data with a high-performance graphics circuit 834 via a high-performance graphics interface 836, e.g., using a PtP interface circuit 837.

At least one embodiment of the invention may be provided within the processors 802 and 804. For example, one or more of the cores 106 of FIG. 1 or 2 may be located within the processors 802 and 804. Other embodiments of the invention, however, may exist in other circuits, logic units, or devices within the system 800 of FIG. 8. Furthermore, other embodiments of the invention may be distributed throughout several circuits, logic units, or devices illustrated in FIG. 8.

The chipset 820 may communicate with a bus 840 using a PtP interface circuit 841. The bus 840 may have one or more devices that communicate with it, such as a bus bridge 842 and I/O devices 843. Via a bus 844, the bus bridge 843 may communicate with other devices such as a keyboard/mouse 845, communication devices 846 (such as modems, network interface devices (e.g., the network adapter 730 of FIG. 7), or other communication devices that may communicate with the computer network 731), audio I/O device, and/or a data storage device 848. The data storage device 848 may store code 849 that may be executed by the processors 802 and/or 804.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Thus, embodiments of methods, apparatuses, and systems have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A method comprising:
   receiving instruction to abort a transactional memory access, wherein the instruction includes an immediate argument; and
   in response to the instruction, aborting the transactional memory access and storing the immediate argument in a first storage unit.

2. The method of claim 1, further comprising:
   executing a fallback handler to respond to the abort from the transactional memory access.

3. The method of claim 1, further comprising:
   in response to the instruction, coping the value stored in the first storage unit into a second storage unit.

4. The method of claim 1, further comprising:
   restoring a state of one or more components of a processor.

5. The method of claim 1, wherein the first storage unit is a general purpose EAX register.

6. The method of claim 1, wherein the first storage unit is a specially purposed register.

7. The method of claim 1, wherein the immediate argument is an enumerated value corresponding to an enumeration of an error condition.

8. The method of claim 1, further comprising:
   outputting the value stored in the first storage unit to a display.

9. An apparatus comprising:
   a decode unit to receive an instruction to abort a transactional memory execution, wherein the instruction includes an immediate argument; and
   an execution unit to abort a transactional memory access and store the immediate argument in a first storage unit.

10. The apparatus of claim 9, wherein the first storage unit is an EAX register.

11. The apparatus of claim 9, wherein the first storage unit is a status register.

12. The apparatus of claim 9, further comprising:
    microcode to cause the execution unit to abort the transactional memory execution and store the immediate argument in the first storage unit.

13. The apparatus of claim 12, wherein the microcode causes the execution unit to execute a fallback handler to respond to the abort from the transactional memory execution.

14. The apparatus of claim 9, further comprising:
    a second storage unit to store the immediate of the first storage unit.

15. A system comprising:
    a memory to store data; and
    a processor comprising:
       a decode unit to receive an instruction to abort a transactional memory access, wherein the instruction includes an intermediate argument; and
       an execution unit to abort a transactional memory access and store the intermediate argument in the first storage unit.

16. The system of claim 15, wherein the first storage unit is an EAX register.

17. The system of claim 15, wherein the first storage unit is a status register.

18. The system of claim 15, wherein the processor further comprising:
    microcode to cause the execution unit to abort the transactional memory access and store the intermediate argument in the first storage unit.

19. The system of claim 18, wherein the micro-code causes the execution unit to execute a fallback handler to respond to the abort from the transactional memory access.

20. The system of claim 15, further comprising an audio device.

* * * * *